TREVOR O. DAVIDSON,
INVENTOR.

ATTORNEY.

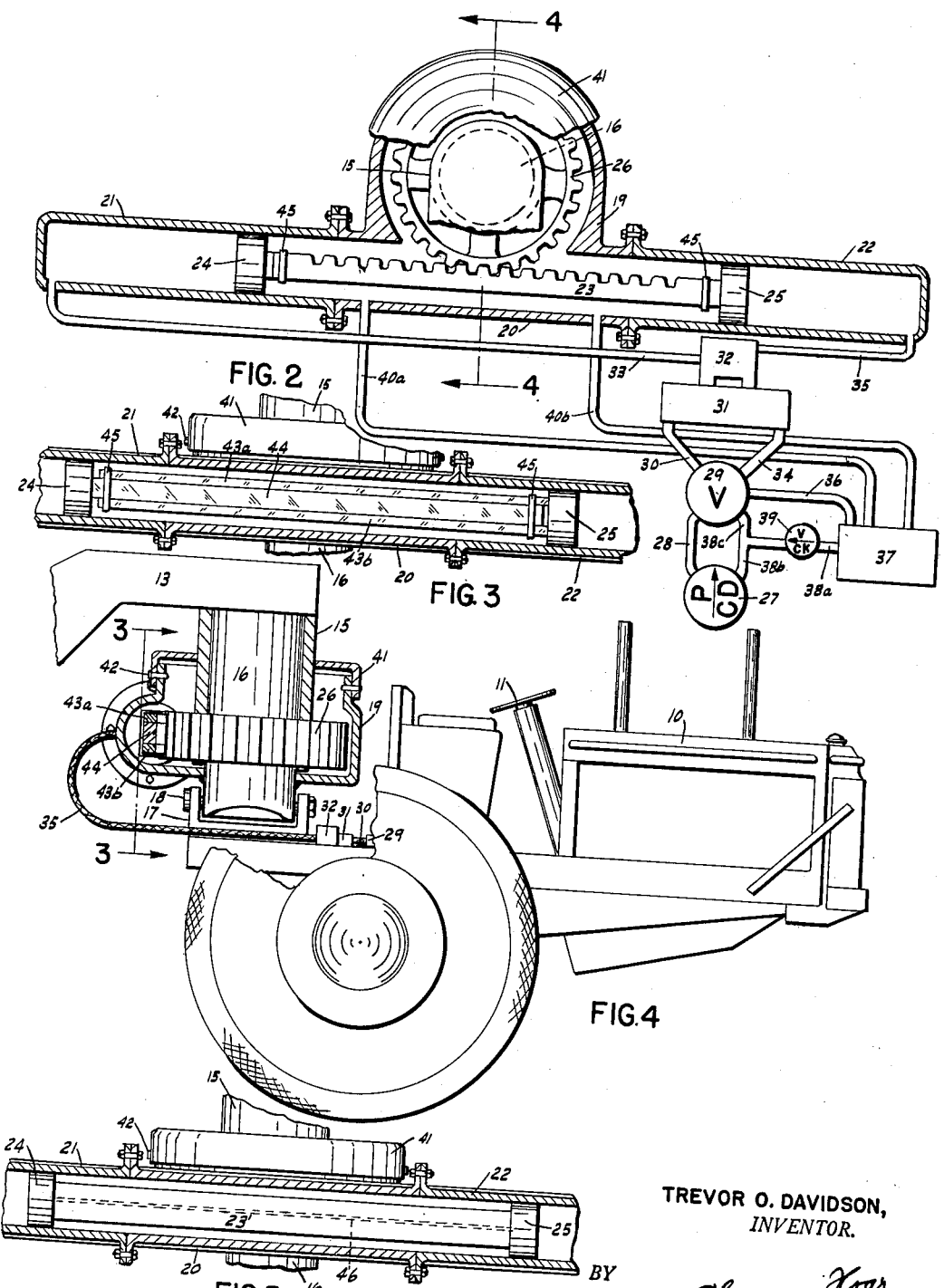

June 8, 1954

T. O. DAVIDSON 2,680,491

HYDRAULIC POWER STEERING FOR VEHICLES
WITH SWINGABLE AXLES

Filed Sept. 28, 1950

TREVOR O. DAVIDSON,
INVENTOR.

BY Roger Sherman Hoar

ATTORNEY.

June 8, 1954

T. O. DAVIDSON

HYDRAULIC POWER STEERING FOR VEHICLES
WITH SWINGABLE AXLES 2,680,491

Filed Sept. 28, 1950

TREVOR O. DAVIDSON,
INVENTOR.

BY
Roger Sherman Hoar

ATTORNEY.

Patented June 8, 1954

2,680,491

UNITED STATES PATENT OFFICE 2,680,491

HYDRAULIC POWER STEERING FOR VEHICLES WITH SWINGABLE AXLES

Trevor O. Davidson, Milwaukee, Wis., assignor to Bucyrus-Erie Company, South Milwaukee, Wis., a corporation of Delaware Application September 28, 1950, Serial No. 187,235

11 Claims. (Cl. 180—79.2)

My invention relates to new and useful improvements in pivot control means, such as power-steering mechanisms for fifth-wheel-type two-wheeled tractors.

Such tractors commonly are used to pull two-wheeled trailers, scrapers and the like, where the trailer or the scraper has a fifth-wheel connection with the tractor. Steering is accomplished by a turning movement of the tractor relative to the trailer or scraper, the fifth wheel serving as a pivot. The steering mechanism used should be simple and rugged yet sensitive to control. Although the steering mechanism should not be affected by one of the tractor wheels encountering small obstacles or traveling surfaces different from that encountered by the other tractor wheel, some yielding movement is desirable to reduce shock produced by a large obstacle.

It also is necessary to prevent the tractor from swinging from side to side as a wheel encounters soft ground.

Furthermore, the steering mechanism should be compactly grouped around the fifth wheel.

And lastly, if the power source of the steering mechanism fails, the tractor should automatically be locked against rotation about the fifth wheel.

Accordingly, the principal objects of my invention are:

(1) To provide a pivot control means of very simple design, with few parts, which will have great strength without undue bulk.

(2) To provide a compact power-steering mechanism, closely grouped around the fifth wheel.

(3) To provide a power-steering mechanism which, upon a failure of the power source, will automatically hold the tractor in the same angular relation to the trailer or scraper as immediately before the failure.

(4) To provide a power-steering mechanism which will absorb most of any large shock applied to one of the tractor wheels, and will permit the tractor to rotate only slightly in the direction of the shock.

(5) To provide a power-steering mechanism which will eliminate side-to-side swinging of the tractor due to variations in hardness of the ground over which the tractor travels.

(6) To provide a power-steering mechanism which has no backlash.

In addition to the objects above stated, I have worked out a number of novel and useful details, which will be readily evident as the description progresses.

My invention consists in the novel parts, and in the combination and arrangement thereof, which are defined in the appended claims, and of which two embodiments are exemplified in the accompanying drawings, which are hereinafter particularly described and explained.

Throughout the description, the same reference number is applied to the same member or to similar members.

Referring now to the accompanying drawings, it will be seen that:

Figure 2 is an enlarged top view, partly in cross-section, of the embodiment of the steering device shown in Figure 1, taken along the line 2—2 of Figure 1, with the hydraulic steering controls and the control unit shown schematically.

Figure 3 is a rear cross-section view taken along line 3—3 of Figure 4.

Figure 4 is a side view partly in cross-section taken along line 4—4 of Figure 2.

Figure 5 is a rear cross-section view similar to Figure 3, but showing a variant of the rack shown in Figure 3.

Figure 1:
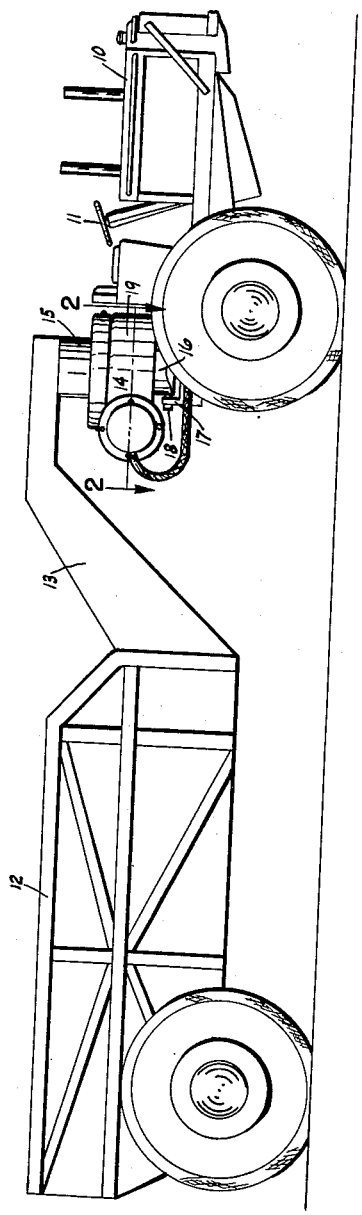
Figure 1 is a side elevation, somewhat conventionalized, of a tractor-trailer combination, equipped with the first embodiment of my power-steering mechanism.

Referring now to Figure 1, we see conventionalized two-wheeled tractor 10, steered by steering wheel 11 and coupled to a conventional semi-trailer wagon 12 through gooseneck 13 and fifth-wheel assembly 14. The fifth-wheel assembly 14 includes a columnar member 15 fixed to gooseneck 13 and rotatable about vertical kingpin 16. Kingpin 16 is mounted on tractor 10 by means of bracket 17 and horizontal pin 18 on the longitudinal axis of the tractor. Pin 18 is mounted in bracket 17, which is rigidly attached to tractor 10. Either tractor 10 or semi-trailer 12 may then pivot about assembly 14 with respect to the other in a horizontal plane, and may pivot about pin 18 with respect to the other in a transverse vertical plane, but any relative movement between tractor 10 and trailer 12 in the plane of Figure 1 is prevented.

Figure 7:
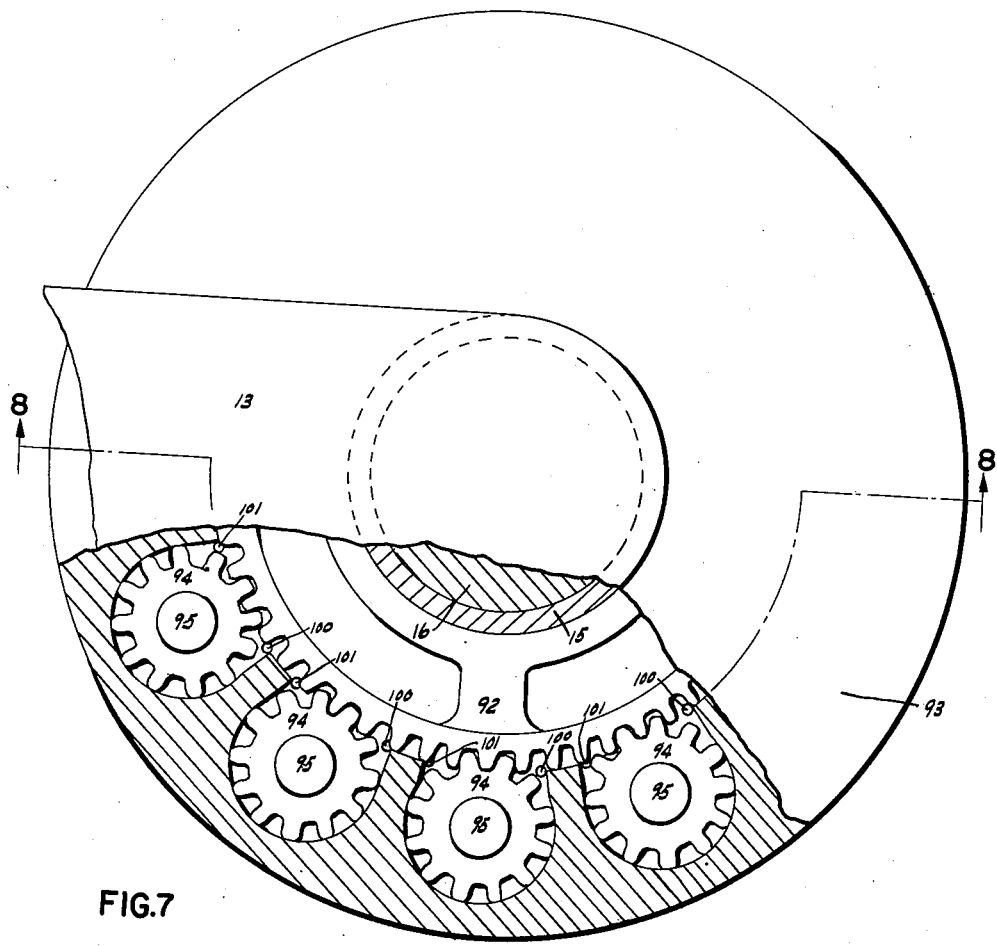
Figure 7 is an enlarged top cross-section view similar to Figure 2 of a second embodiment of the steering device.
Figure 8:
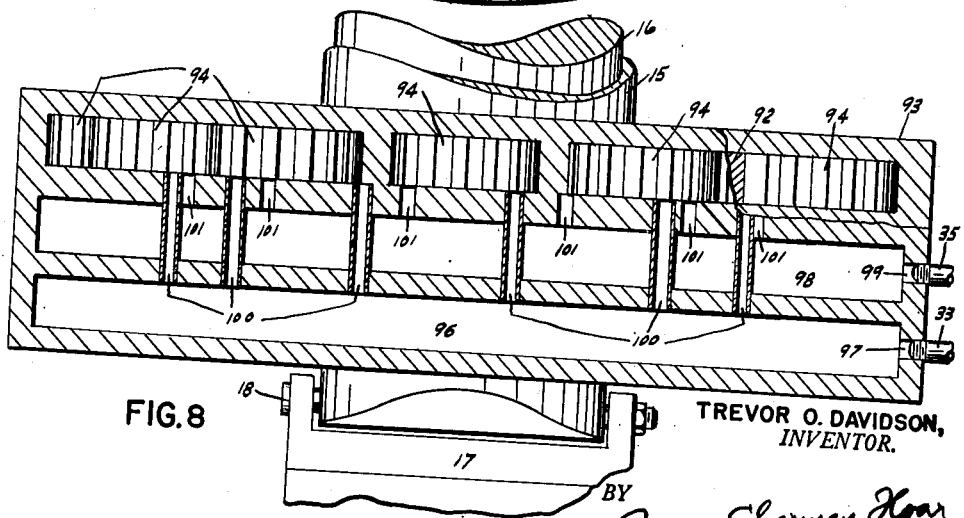
Figure 8 is a side cross-section view taken along line 8—8 of Figure 7.
Figure 9:
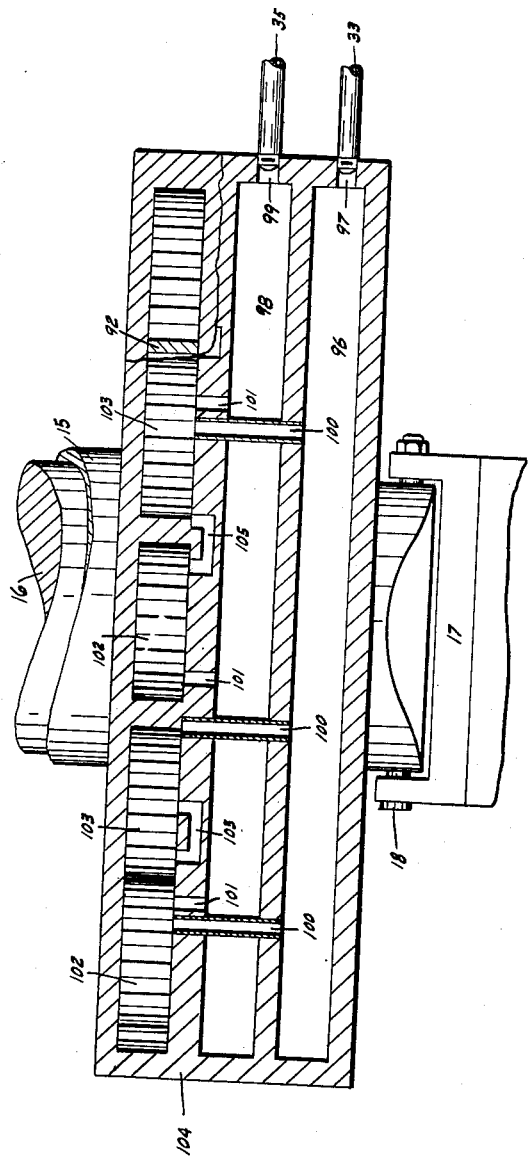
Figure 9 is a side cross-section view similar to Figure 8, but showing a variant of the embodiment shown in Figure 8.

Housing 19, rigidly attached to kingpin 16, contains the steering device, the first embodiment of which is detailed in Figures 2 to 5 inclusive, a second embodiment being detailed in Figures 7 to 9 inclusive, each embodiment having two variants.

Turning now to Figure 2, we see that housing 19 has a rearward extension 20 on each end of which is attached a cylinder with a closed outer end, the two cylinders being numbered 21 and 22 respectively. Contained within housing 19 is rack 23, at each end of which is fixed a piston, numbered 24 and 25 respectively, which pistons fit within cylinders 21 and 22.

Rack 23 meshes with spur gear 26, which is mounted within housing 19 and attached to column 15 for rotation therewith. It is obvious that rack 23 could be connected indirectly by gearing to gear 26, though I prefer the direct meshing connection shown; however my invention is not to be limited to such direct connection.

Pump 27, which is mounted on tractor 10 and powered by the engine of tractor 10, is a conventional hydraulic pump that forces hydraulic fluid through outlet line 28 into valve 29, which valve is well kown in the art and forms no part of my present invention, and so is merely shown schematically in the figures. Valve 29 controls the flow of hydraulic fluid, having three settings for diverting the fluid into any one of three channels: (1) through line 30, valve 31, valve assembly 32, and line 33 into cylinder 21; (2) through line 34, valve 31, valve assembly 32, and line 35 into cylinder 22; or (3) through return line 36 back to reservoir 37. Valve 31 and valve assembly 32 will later be described in detail and their functions explained fully.

Hydraulic fluid reservoir 37 is connected to the inlet side of pump 27 through lines 38a and 38b. Valves 29 is connected to the inlet side of pump 27 through lines 38c and 38b. One-way spring-actuated check valve 39 in line 38a prevents flow of hydraulic fluid from line 38b through line 38a into reservoir 37, but permits flow from reservoir 37 through line 38a into line 38b when there exists in line 38b a pressure sufficiently lower than the gravity-created pressure in reservoir 37 to overcome the actuating spring in check valve 39.

Line 40a, which leads from extension 20 adjacent cylinder 21 to reservoir 37, prevents bottoming of piston 25 in cylinder 22 by carrying actuating fluid from cylinder 21 back to reservoir 37 when rack 23 reaches its limit of travel to the right. Line 40b performs a similar function for movement of rack 23 to the left.

Valves 29 and 31 and valve assembly 32 may be located at any appropriate and convenient place on the tractor 10 or on housing 19 or its extension 20. Valve 29 is actuated to divert fluid into either line 30 or line 34 by steering wheel 11, through conventional mechanical, hydraulic or electrical controls (not shown) as desired.

Thus Figure 2 illustrates the invention with what is known as a "closed" hydraulic system, in which the fluid-return line under at least some conditions leads directly to the inlet side of the pump. Such a system has certain advantages over an "open" hydraulic system, in which the return line leads into the reservoir and the reservoir is the only source of fluid for the pump. These advantages will be later described.

Dust cover 41 is removably attached to housing 19 by means such as cap screws 42 (Figure 4) and fits closely around but in rotatable relation with column 15.

Rack 23 is divided longitudinally in a horizontal plane into three segments, 43a, 43b and 44. This is better shown in Figures 3 and 4. Segments 43a and 43b are fixed to piston 25 and extend just short of piston 24. Segment 44 is fixed to piston 24 and extends just short of piston 25. Bands 45 are fixedly attached to segments 43a and 43b to guide segment 44 longitudinally between segments 43a and 43b, for reasons which will be described later.

Figure 5 shows a variant in which rack 23' is in integral form with bleeder passage 46 drilled longitudinally therethrough and through pistons 24 and 25. The function of bleeder passage 46 will be described later.

Figure 6:
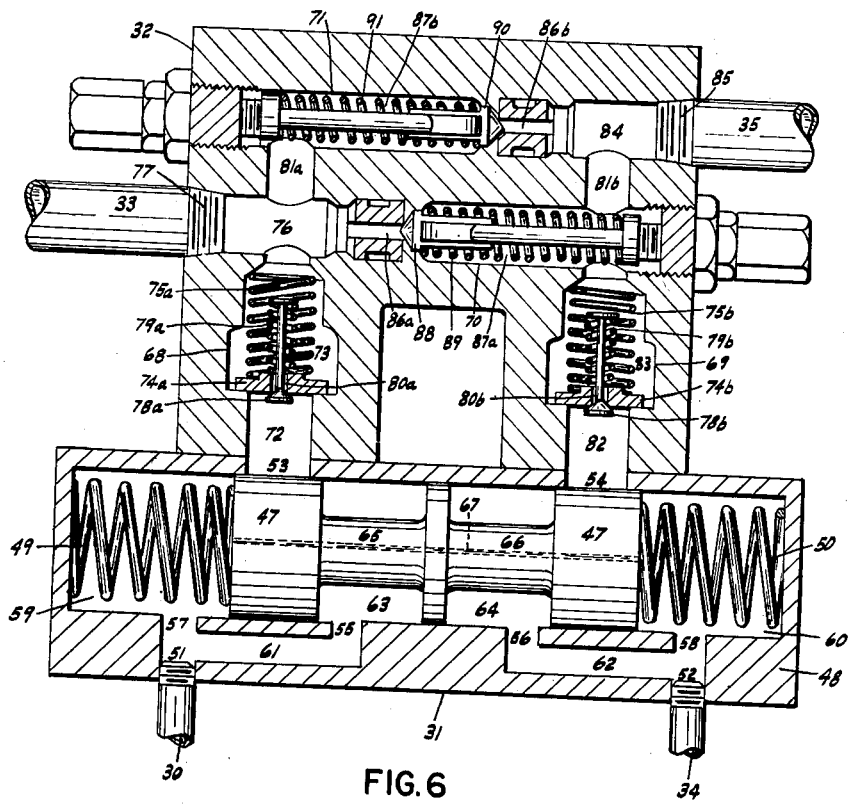
Figure 6 is a top cross-section view of valve 31 and valve assembly 32 of the hydraulic system shown schematically in Figure 2.

Turning now to Figure 6, which shows valve 31 and valve assembly 32 in section, it is seen that valve 31 is made up of plunger 47, casing 48 and compression springs 49 and 50 which are of equal strength. Casing 48 has pump ports 51 and 52, and operating ports 53 and 54. Passages 57 and 58 connect pump ports 51 and 52 to operating chambers 59 and 60 respectively. Passages 55—61 and 56—62 connect pump ports 51 and 52 to return chambers 63 and 64. Plunger 47 has annular grooved depressions 65 and 66 for return flow to passages 55 and 56. Bleeder hole 67, bored lengthwise through the stem of piston 47, permits either spring 49 or 50 to return plunger 47 to neutral position (Figure 6) when flow has ceased and a small residual fluid pressure opposes such return.

When hydraulic fluid under pressure sufficient to overcome spring 50 is admitted through port 51, plunger 47 will move to the right, thus uncovering port 53 so that the fluid will flow from line 30 through port 51, passage 57, operating chamber 59 and operating port 53. Port 54 will also be uncovered, so that a return-flow passage will be presented through port 54, return chamber 64, passage 56, passage 62 and port 52 to line 34. The flow through bleeder hole 67 is not sufficient to materially reduce the pressure admitted through port 51.

If hydraulic fluid under pressure is admitted to operating port 52, the converse will occur: the pressure will overcome spring 49, plunger 47 will move to the left, uncovering ports 54 and 53, fluid will flow out of valve 31 through port 54, and a return-flow passage will be presented through port 53, return chamber 63, passage 55, passage 61 and port 51 to line 30.

Valve assembly 32 is made up of four valves, compound valves 68 and 69 and relief valves 70 and 71, these four valves being shown in Figure 6 in one block, though they could be separated and joined together operatively by means of hydraulic lines.

Port 53 of valve 31 connects directly to lower chamber 72 of compound valve 68, lower chamber 72 being separated from upper chamber 73 by plunger 74a. Plunger 74a is actuated by spring 75a. Chamber 73 connects with chamber 76, which in turn connects with hydraulic line 33 through port 77. Passage 81a connects chamber 76 to relief valve 71.

Compound valve 68 also includes plunger 78a, which is actuated by spring 79a to normally block passage 80a through plunger 74a.

Compound valve 69, similar to valve 68, is made up of lower and upper chambers 82 and 83, plungers 74b and 78b, springs 75b and 79b, and passage 80b. Chamber 83 is connected to hydraulic line 35 through chamber 87a, passage 81b, chamber 84 and port 85.

One-way relief valve 70 operates to relieve any excess pressure in chamber 76 that may arise when plunger 47 is in the neutral position shown in Figure 6. Passage 86a connects with chamber 87a, but is normally blocked by plunger 88, which is actuated by spring 89.

One-way relief valve 71 is similar to valve 70. It includes passage 86b, chamber 87b, plunger 90 and spring 91.

The first embodiment of my invention (shown in Figures 2 to 5 inclusive) operates as follows:

Lines 33 and 35, valve assembly 32, and cylinders 21 and 22 are normally full of hydraulic fluid under pressure, and when valve 29 is in neutral (hold) position fluid from pump 27 merely flows through line 28, valve 29, line 36 and back to reservoir 37. Pump 27 draws fluid from reservoir 37 through lines 38a and 38b.

When the operator of the tractor wishes to turn to the right he rotates steering wheel 11 in a clockwise direction. This rotation moves valve 29 (Figure 2) from its neutral (hold) position into right-turn position so that fluid in line 28 under pressure from pump 27 enters line 30 and return fluid flows from line 34 into line 38c—38b. Line 30 carries the fluid into operating chamber 59 of valve 31 through port 51 and passage 57 (Figure 6) where the pressure, which is sufficient to overcome spring 50, forces plunger 47 to the right, thus uncovering port 53. The fluid then enters chamber 72 of compound valve 68, where the pressure, being sufficient to overcome spring 75a, forces plunger 74a to move upwardly, so that the fluid enters chamber 73, passes through chamber 76, port 77, and line 33 and enters cylinder 21. In cylinder 21 the fluid pressure forces piston 24, carrying rack 23 with it, to the right, thus rotating gear 26 in a counterclockwise manner with respect to rack 23 as seen in Figure 2. Since cylinder 21 is rigidly supported by tractor 10 with respect to rotation about a vertical axis, and gear 26 is supported by and in fixed relation to trailer 12, there results a clockwise movement of tractor 10 relative to trailer 12 about the pivot of kingpin 16, thus changing to the right the direction of travel of the tractor-trailer unit.

The movement of rack 23 (Figure 2) to the right, carries piston 25 to the right, forcing fluid out of cylinder 22 through line 35 into valve assembly 32. This fluid passes through port 85 and enters chamber 84 (Figure 6), passages 86b and 81b, and chambers 83 and 87a. Valve 10, being a one-way valve, prevents passage of the fluid out of chamber 87a into chamber 76. Spring 79b is weaker than spring 91, so the pressure forces plunger 78b downwardly, permitting the fluid to pass through compound valve 69 into chamber 82.

Since plunger 47 had been moved to the right by the fluid pressure entering through port 51, port 54 of valve assembly 31 was uncovered, so that the fluid from chamber 82 of valve 69 passes through port 54, return chamber 64, passage 56, passage 62, port 52 and into line 34. Line 34 carries the fluid to valve 29 which, in its movement to direct flow from line 28 into line 30, has moved to open a passage for the fluid from line 34 to flow into line 38c—38b and thence to the intake side of pump 27.

Since return fluid from cylinder 22 must overcome spring 79b, there will be pressure against the face of piston 25 opposing pressure against the face of the other piston 24. Similarly, pressure will be maintained against piston 24 when valve 29 is set for steering in the opposite direction. This pressure is proportional to the strength of spring 79a or 79b, as the case may be. The opposing forces on pistons 24 and 25 cause the teeth of rack segments 43a and 43b to exert a force on the meshed teeth of gear 26 in a direction opposite to the force exerted thereon by the teeth of rack segment 44. This provides an automatic "take-up" and prevents any looseness or "play" between the rack and the gear, even though there be wear of the teeth on the rack and gear through long use.

It will be seen that rack 23 could be constructed of a number of segments different from the three I have chosen without departing from my invention.

If rack 23' be in one integral piece (Figure 5), there will be no automatic "take-up," but a simple relief means such as bleeder passage 46 through rack 23' and pistons 24 and 25 may be substituted for relief valves 70 and 71.

When steering wheel 11 is turned to steer tractor 10 to the left, valve 29 is rotated so as to divert fluid to flow through line 34, pump port 52, passage 58, operating chamber 60, operating port 54, compound valve 69, passage 81b, chamber 84, line 35 and into cylinder 22. Return fluid from cylinder 21 will flow through line 33, chamber 76, compound valve 68, operating port 53, return chamber 63, passage 55, passage 61, pump port 51, line 30, valve 29, and line 38c—38b back to the inlet side of pump 27.

When steering wheel 11 is returned to neutral position, valve 29 returns to neutral setting in which fluid from pump 27 is returned to reservoir 37 through line 36, the flow of fluid into cylinder 21 ceases, and no further relative movement between tractor 10 and trailer 12 occurs. Then, since there is no movement of fluid through and no consequent source of dynamic pressure in valve 31, spring 50 in valve 31 will push plunger 47 to the left into neutral position (Figure 6), the fluid displaced from operating chamber 59 of valve 31 by such return movement of plunger 47 flowing through bleeder hole 67 in the stem of plunger 47 into operating chamber 60. When plunger 47 is in the neutral position, the fluid in cylinders 21 and 22 is locked therein, except as follows:

If the left tractor wheel hits a rock, this imposes a shock load on the steering device and tends to turn the tractor. This results in a sudden increase in fluid pressure in cylinder 21 (Figure 2). Relief valve 70 (Figure 6) is provided to relieve this shock. When the pressure in cylinder 21 reaches a predetermined point (the pressure in line 33, chamber 76 and passage 86a being, of course, the same), plunger 88 will move to the right against spring 89, permitting fluid to flow into chamber 87a, passage 81b, chamber 84, line 35 and into cylinder 22. Since pressure in cylinder 22 was decreased by the tendency of tractor 10 to rotate to the left, there results a displacement of fluid from cylinder 21 into cylinder 22, which permits tractor 10 to swingingly drift to the left, thus "rolling" with the imposed shock load and decreasing the likelihood of damage from the shock. This drift motion will cease when the fluid pressure created by the shock load no longer overcomes spring 89. Conversely, if the shock load imposed on tractor 10 is in the opposite direction, the drift will be opposite, relief spring 91 being overcome and fluid flowing out of cylinder 22, through line 35, into chamber 84, passage 86b, chamber 87b, passage 81a, chamber 76, line 33 and into cylinder 21.

When rack 23' is in one integral piece (Figure 5), flow of fluid through relief means such as bleeder passage 46 relieves excess pressure in one of cylinders 21 and 22 over the pressure in the other.

The purpose of valve 31 is to hold the tractor from swinging freely if a failure occurs in the hydraulic steering system. When valve 29 is in neutral position, plunger 47, being also in neutral as shown in Figure 6, blocks any flow of fluid into or out of cylinders 21 and 22, except as permitted by relief valves 70 or 71.

If the hydraulic system fails between pump 27 and port 51 of valve 31 when fluid is being pumped to cylinder 21, spring 50 will return plunger 47 to the neutral position (Figure 6), thus blocking the fluid in cylinders 21 and 22 and so preventing further relative movement between tractor 10 and trailer 12. Conversely, upon a failure between pump 27 and port 52 of valve 31 when fluid is being pumped to cylinder 22, spring 49 will return plunger 47 to neutral position (Figure 6), again preventing further relative movement between tractor 10 and trailer 12.

The advantage of using a closed hydraulic system, as illustrated in Figure 2, in conjunction with valve 31 is that if the hydraulic system fails between port 52 of valve 31 and pump 27 when valve 29 is set to divert fluid to cylinder 21, pump 27 will be starved for fluid as soon as lines 34 and 38b—38c are emptied, because the atmospheric pressure admitted into lines 34 and 38b—38c by the failure will, when added to the force exerted by the spring of check valve 39, keep check valve 39 closed against flow from reservoir 37 to the intake of pump 27. Thereupon the pressure at port 51 will be lost and spring 50 will force plunger 47 to the left, again blocking ports 53 and 54 and preventing relative swinging movement between tractor 10 and trailer 12. Similarly, if failure occurs between port 51 of valve 31 and pump 27 when valve 29 is set to divert fluid to cylinder 22.

Valve 31 performs an additional function. If, while rack 23 is moving to the left under pressure in cylinder 22, the left wheel of tractor 10 strikes an obstruction which also tends to move rack 23 to the left, the pressure in cylinder 22 and in the hydraulic system between cylinder 22 and pump 27 will drop, allowing spring 49 to return plunger 47 to neutral position (Figure 6) and so prevent overcontrol until the obstruction has passed. Similar results obtain for steering in the other direction when the right wheel of tractor 10 hits an obstruction.

A second embodiment of my invention is shown in Figures 7, 8 and 9. Spur gear 92 is keyed to column 15 which is fixed to gooseneck 13 of trailer 12. Housing 93, in which pinions 94 are rotatably mounted about the periphery of gear 92 by means of pins 95, is fixed to kingpin 16. Pinions 94 mesh with gear 92 and in conjunction with gear 92 form a gear-type hydraulic motor.

Chamber 96 (Figure 8) in housing 93 is connected to hydraulic line 33 through port 97. Chamber 98 in housing 93 is connected to hydraulic line 35 through port 99. Passages 100 lead through chamber 98 from chamber 96 to one of the points of intersection of the outside circumferences of pinions 94 with the outside circumference of gear 92. Passages 101 lead from chamber 98 to the other points of intersection of pinions 94 and gear 92.

The second embodiment of my invention operates as follows:

When valve 29 is set to divert fluid under pressure from pump 27 through line 30, valve 31, valve assembly 32, and line 33 into chamber 96, the fluid will go through passages 100 to the right side (Figure 7) of each of pinions 94. This will set up pressure forcing the pinions to rotate in a clockwise direction. This rotation will cause housing 93 (and tractor 10, to which it is fixed) to rotate in a clockwise direction with respect to gear 92 (and trailer 12, to which it is fixed), thus turning the tractor 10 to the right.

Fluid which enters through passages 100 will be carried (by the clockwise rotation of pinions 94 and the counterclockwise rotation of gear 92) around between the teeth of the pinions and the teeth of the gear to passages 101 through which it will discharge into chamber 98, then through line 35 and finally back to the intake side of pump 27 through lines 38c and 38b.

To steer tractor 10 to the left, valve 29 is set to divert fluid under pressure from pump 27 through line 34, valve 31, valve assembly 32, line 35 and into chamber 98. The fluid then goes through passages 101 to the other side of pinions 94. The pressure causes the pinions to rotate in a counterclockwise direction, resulting in steering the tractor to the left. The fluid is discharged through passages 100 into chamber 96, whence it returns to the intake side of pump 27.

One or several pinions may be used, the hydraulic pressure required for operation decreasing with increase in number of pinions.

Figure 9 illustrates a variant of my second embodiment, in which pinions 102 and 103 are mounted in housing 104 to mesh with gear 92 (fixed to column 15), housing 104 being fixed to kingpin 16. Rotation of pinions 103 is used to turn tractor 10 to the right, and rotation of alternate pinions 102 is used to turn tractor 10 to the left. That is, regardless of the number of pinions utilized, alternate pinions drive against gear 92 to produce steering of the tractor 10 in a given direction.

In this variant, adjacent pinions are paired for the purpose of fluid flow, alternate pairs of adjacent passages being connected by passages 105.

In other respects, the variant of Figure 9 is similar to the embodiment shown in Figures 7 and 8, except that compound valves 68 and 69 may be utilized to eliminate backlash between the pinions (102 and 103) and gear 92, as explained below.

The variant of my second embodiment (Figure 9) operates as follows: When valve 29 (Figure 2) is set to divert fluid under pressure into line 30, through valve 31, valve assembly 32, line 33 and into chamber 96, the fluid will pass through passages 100 and act upon pinions 103 so as to rotate the pinions in a clockwise direction. This steers tractor 10 to the right as previously explained. The fluid which entered through passages 100 is carried around by the teeth of pinions 103, through passages 105, around by pinions 102 and out passages 101 into chamber 98. Then the fluid passes out through line 35, valve assembly 32, valve 31, line 34, valve 29, line 38c—38b and back to the intake side of pump 27.

Since the return fluid must overcome spring 79b of compound valve 69, there will be a consequent reluctance to rotation on the part of pinions 102, due to the fact that the discharge through passages 101 can occur only as spring 79b is overcome. Pinions 102 then act as brakes yieldably resisting the rotation of gear 92 with respect to housing 104 caused by the rotation of pinions 103. This resistance results in a gripping of the teeth of gear 92 between the teeth of pinions 102 and 103, which eliminates backlash.

To steer tractor 10 to the left, valve 29 is set to divert flow in the direction opposite to that just described.

Whenever in my claims I refer to a gear, I mean to include all conventional types of gears, such as spur gears, bevel gears and racks, without being limited to the enumerated types.

Having now described and illustrated two embodiments of my invention, I wish it to be understood that my invention is not to be limited to the specific form or arrangement of parts herein described and shown, or specifically covered by my claims.

I claim:

1. A power-steering mechanism for a vehicle, which includes a first end frame and a second end frame, each end frame having ground-engaging means, said mechanism comprising: a first member mounted upon and for rotation with the first end frame about an upstanding axis, a second member connected to the second end frame and mounted for rotation with the second end frame about said axis relative to the first member, a pivotal connection between the first member and the first end frame to provide for oscillating movement of the first end frame about a horizontal longitudinal axis of the first end frame, a gear rigidly mounted on one of said members to rotate when the member on which it is mounted rotates about said axis, rack means slidably mounted on and in fixed angular relation to the other member and operatively connected to said gear, and hydraulic ram means operatively connected to the rack means and said other member to force longitudinal movement of the rack means whereby the gear and the member on which it is mounted will be rotated relative to the rack means and the member on which it is mounted; said power-steering mechanism being further characterized by the fact that the hydraulic ram means comprises a pair of cylinders rigidly mounted on said other member, a pair of pistons one within each of said cylinders, the rack means having a pair of longitudinally overlapping relatively longitudinally shiftable toothed rack sections, one rack section being attached to one piston and the other rack section being attached to the other piston, both sections meshing with said gear; and valve means associated with each of said cylinders to maintain hydraulic fluid pressure above a predetermined minimum against each of said pistons to force said pistons in opposite directions and thereby eliminate backlash between said rack means and said gear.

2. A power-steering mechanism for a vehicle, which vehicle includes a first end frame and a second end frame, each end frame having ground-engaging means, said mechanism comprising: a source of hydraulic pressure-fluid; a sink for hydraulic pressure fluid; a double-acting hydraulically-actuated power-mechanism to effect the steering of the vehicle; a reversing valve; a supply conduit extending from the source to this valve; an exhaust conduit extending from this valve to the sink; two passages, alternatively supply and exhaust, extending between the reversing-valve and the power-mechanism; and an automatic valve intercepting both passages, to prevent loss of control in event of hydraulic failure, said automatic valve comprising a valve-casing having two normally-open ports connecting with the passages on the side toward the reversing valve and two ports connecting with the passages on the side toward the power-mechanism and a plunger associated with said passages within said casing normally resiliently constrained to block fluid flow through both passages, but movable to open both passages under the influence of excess of pressure in either passage over that in the other passage.

3. A power-steering mechanism according to claim 2, characterized by having in each passage a check-valve to permit fluid flow therethrough only toward the power-mechanism, and a bleeder to resist fluid flow in the other direction, thereby setting up a back pressure.

4. A power-steering mechanism according to claim 3, further characterized by having in each bleeder a check-valve to permit fluid flow therethrough only away from the power-mechanism, and then only responsive to pressure above a predetermined minimum.

5. A power-steering mechanism according to claim 4, still further characterized by having relief-connection between the two passages.

6. A power-steering mechanism according to claim 5, still further characterized by the fact that the relief-connection comprises two relief-valves, one to relieve excessive pressure in one passage, and the other to relieve excessive pressure in the other passage.

7. A power-steering mechanism according to claim 2, characterized by the fact that the power-mechanism comprises: a gear mounted on the first end frame to rotate therewith with respect to the second end frame; and an hydraulically-operated toothed mechanism, with its teeth engaging said gear, movably mounted on and in constrained relation to the second end frame, whereby hydraulic actuation of the toothed mechanism causes the gear and the first end frame, to rotate relative to the second end frame.

8. A power-steering mechanism according to claim 7, further characterized by the fact that the hydraulically-operated toothed mechanism, comprises toothed mechanism actuable to rotate the gear in one direction, and toothed mechanism actuable to rotate the gear in the opposite direction, and by having associated with each of said opposing mechanisms valve means to maintain hydraulic fluid back-pressure above a predetermined minimum, and thereby eliminate backlash between the tooth mechanism and the gear.

9. A power-steering mechanism according to claim 8, still further characterized by the fact that the hydraulically-operated toothed mechanism comprises a pair of longitudinally overlapping relatively longitudinally shiftable toothed rack-sections, and two opposing cylinder-piston assemblies, each such assembly being mounted on and attached to the second end frame and operatively connected to one of the two rack-sections, to reciprocate the same.

10. A power-steering mechanism according to claim 2, characterized by the fact that each end of the casing constitutes a cylinder, in which one end of the plunger acts as a piston; that the portion of each passage on the side toward the reversing valve is forked, one branch ending in one of the cylinders, and the other branch ending in a portion of the casing intermediate the two cylinders; that the portion of each passage on the side toward the power-mechanism ends in a port in the casing; that the plunger has two cross-passages, and is spring-biased to assume a central position, in which it blocks flow both to and from the power-mechanism; but when pressure fluid from the reversing valve is admitted to either cylinder, the plunger slides toward the farther end of the casing, the adjacent cross-passage admits fluid from the cylinder to the adjacent port on the side toward the power-mechanism, and the farther cross-passage admits fluid from the farther port on the side toward the power-mechanism to the farther port on the side toward the reversing valve.

11. A power-steering mechanism for a vehicle, which includes a first end frame and a second end frame, each end frame having ground-engaging means, said mechanism comprising: a first member mounted upon the first end frame for oscillation about a horizontal longitudinal axis of said end frame and for rotation with the first end frame about an upstanding axis, a second member connected to the second end frame and mounted for rotation with the second end frame about said axis relative to the first member, a gear rigidly mounted on one of said members to rotate when the member on which it is mounted rotates about said axis, an hydraulically-operated toothed mechanism, with its teeth engaging said gear, movably mounted on and in constrained relation to the other member, whereby hydraulic actuation of the toothed mechanism causes the gear and the member on which it is mounted to rotate relative to the member on which the toothed mechanism is mounted; said power-steering mechanism being characterized by the fact that the hydraulically-operated toothed mechanism comprises a pair of hydraulically-actuated toothed means both said toothed means meshing with said gear, one of said toothed means being hydraulically actuable to rotate the gear in one direction, and the other of said toothed means being hydraulically actuable to rotate the gear in the opposite direction; and valve means associated with each of said toothed means to maintain hydraulic fluid pressure above a predetermined minimum against each of said toothed means to force said two toothed means in opposite directions and thereby eliminate backlash between said toothed means and said gear.

References Cited in the file of this patent

UNITED STATES PATENTS

| Number | Name | Date |
| --- | --- | --- |
| 1,872,214 | Farley | Aug. 23, 1932 |
| 2,020,951 | Lemon | Nov. 12, 1935 |
| 2,532,786 | Richter | Dec. 5, 1950 |